United States Patent [19]

Akamatsu

[11] 4,134,054
[45] Jan. 9, 1979

[54] HOMOPOLAR SYNCHRONOUS MACHINE

[75] Inventor: Masahiko Akamatsu, Amagasaki, Japan

[73] Assignee: Mitsubishi Denki Kabushiki Kaisha, Tokyo, Japan

[21] Appl. No.: 826,716

[22] Filed: Aug. 22, 1977

Related U.S. Application Data

[63] Continuation of Ser. No. 709,272, Aug. 28, 1976, abandoned, which is a continuation-in-part of Ser. No. 511,440, Oct. 2, 1974, abandoned.

[51] Int. Cl.² ............................................. H02K 37/00
[52] U.S. Cl. ..................................... 318/685; 318/696; 310/49 R; 310/168; 310/112
[58] Field of Search .......... 310/112, 49, 168, 162–165; 318/685, 696

[56] References Cited

U.S. PATENT DOCUMENTS

| | | | |
|---|---|---|---|
| 3,293,460 | 12/1966 | Iwai et al. ............................... | 310/49 |
| 3,293,469 | 12/1966 | Crawford et al. .................... | 310/168 |
| 3,411,059 | 11/1968 | Kaiwa .................................. | 310/49 X |
| 3,767,950 | 10/1973 | Ainvarg ................................ | 310/168 |
| 3,866,104 | 2/1975 | Heine .................................... | 318/696 |

Primary Examiner—Donovan F. Duggan
Attorney, Agent, or Firm—Oblon, Fisher, Spivak, McClelland & Maier

[57] ABSTRACT

A homopolar synchronous machine is disclosed which has a substantially lower inertia than equivalent conventional devices. The device includes components for forming a plurality of closed magnetic circuits along the axis of the stator, whereby the inertia is reduced and performance is improved.

6 Claims, 6 Drawing Figures

STEPPING MOTOR

RATINGS:
- 1.5kW, 3200rpm
- Max Pulse Rate: 16,000 Pulse/sec.
- Max Torque: 1.4kg-m (13.7N-m)
- Inertia: $10 \times 10^{-4}$ N-m·rad$^{-1}$·sec$^{2}$
- Rotor Size: 55mm dia. x 150mm length*

* Effective lamination length

HOMOPOLAR SYNCHRONOUS MACHINE

CROSS REFERENCE TO RELATED APPLICATION

This is a continuation, of application Ser. No. 709,272, filed Aug. 28, 1976, now abandoned which is a continuation-in-part of application Ser. No. 511,440 filed Oct. 2, 1974, now abandoned.

BACKGROUND OF THE INVENTION

1. Field of the Invention

The present invention relates generally to a homopolar synchronous machine and more particularly to such a machine which has a very low inertia.

2. Description of the Prior Art

Synchronous motors have been widely used as control motors such as non-commutator type motors and step motors. Such synchronous motors should ideally have low inertia but conventionally do not. Conventional high frequency generators also have high inertia resulting in long start-up times and serious temperature increases in the rotor. Homopolar synchronous synchronous machines have, of course, been known in the form of brush-less synchronous machines which are suitable for the mentioned applications, but conventionally prior art devices of the types mentioned have more inertia than is desirable.

FIG. 1 is a partial sectional view of one embodiment of a conventional dual homopolar synchronous machine, wherein the reference numerals 1a, 1b designate stator magnetic cores; 2a, 2b designate stator windings (armature windings); 3a, 3b designate rotor magnetic cores spaced from the stator cores by the dielectric gaps $A_1$ and $A_2$; and 4 designates a permanent magnet field means which can be disposed at a back yoke C of the stator yoke 9 or which can be a ring type field winding in the space between the rotor magnetic cores 3a and 3b or between the stator magnetic cores 1a and 1b. The permanent magnet is usually used in small size devices and the field winding is usually used in the larger devices. When a field winding is used, the permanent magnet 4 is replaced by a yoke, or the rotor magnetic cores 3a, 3b are formed in one piece and the rotor is formed in one piece (separate from the drive shaft 6).

Thus, in conventional homopolar synchronous machines, the field magnetic flux is passed, as shown by the arrows, through the rotor magnetic core 3b, the rotor yoke B or the permanent magnet 4, the rotor magnetic core 3a, the stator magnetic core 1a, the stator yoke C and the stator magnetic core 1b. Accordingly, the following equation applies, even though the field magnetic flux passes through the rotor shaft 6:

$$Sb \cdot Bb \geq Sa \cdot Ba \qquad (1)$$

$$Sa = \pi DaL$$

$$Sb = \frac{\pi}{4} Db^2$$

wherein,

L designates the total length of the stator magnetic cores 1a, 1b and the rotor magnetic cores 3a, 3b; Sa designates the area of the space; Sb designates a sectional area of the rotor yoke, Da designates the diameter of the gap; Db designates the diameter of the rotor yoke; Ba designates the average magnetic flux density in the space; and Bb designates maximum permissable magnetic flux density at the rotor yoke. Accordingly, the relation between the diameter of the space Da and the total length L is given by the equation:

$$L = \frac{KD^2}{4} \cdot \frac{Bb}{Ba} \cdot Da^3 \qquad (2)$$

wherein $Db/Da = KD$.

The torque T is proportional to $Da^2$ and the inertia J is proportional to $D^4L$ and accordingly, the ratio of the inertia to the torque, that is the speed change time $\tau$ (also called the acceleration time constant), is given by the equation:

$$\tau = \frac{J}{T} = KD_a^2 \frac{T}{L} \qquad (3)$$

Accordingly, $\tau$ is determined by the diameter of the space Da, and the total length L in the axial direction is limited by equation (2), whereby the output torque T and the output capacity limit is determined by the speed change time $\tau$.

As stated above, conventional homopolar synchronous machines cannot be designed so as to freely and separately adjust the diameter of the gap and the length in the axial direction, whereby the acceleration response time cannot be shortened and the inertia cannot be decreased. That is, when the acceleration response time is shortened, the output cannot be increased. For example, an output of only about ten to several tens of watts has been possible for an acceleration response time of several tens to several hundreds of milliseconds.

SUMMARY OF THE INVENTION

It is thus one object of the present invention to overcome the mentioned disadvantages of conventional homopolar synchronous machines and to provide a homopolar synchronous machine which possesses low inertia.

This and other objects of the invention have been attained by providing a homopolar synchronous machine which comprises a stator having a stator magnetic core and a stator winding; a rotor having a rotor magnetic core which is rotated relative to the stator magnetic core and spaced relative to the stator magnetic core; means for forming closed magnetic circuits which include the rotor-stator spacing, the stator magnetic core and the rotor magnetic core forming a plurality of closed magnetic circuits in the axial direction of the stator and rotor; and means for generating field magnetomotive force which feeds magnetic flux to the closed magnetic circuits to impart a homopolar magnetic field in the rotor-stator space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
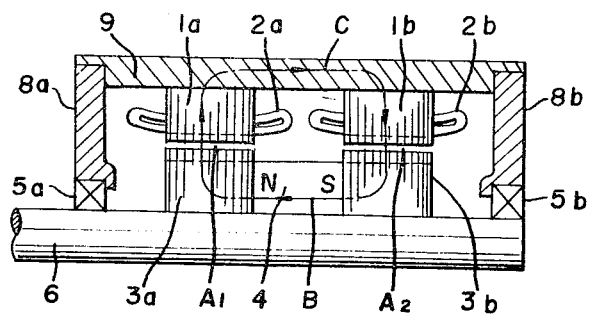
FIG. 1 is a sectional view of a conventional homopolar synchronous machine.
Figure 2:
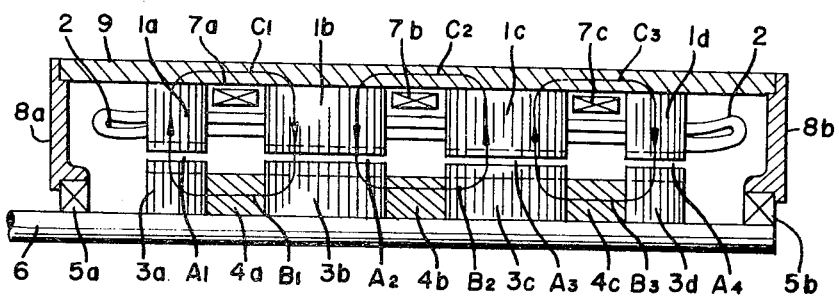
FIG. 2 is a sectional view of one embodiment of the homopolar synchronous machine which imparts low inertia according to the invention.

Referring now to the drawings, wherein like reference numerals designate identical or corresponding parts throughout the several views, and more particularly to FIG. 2 thereof, a sectional view of one embodiment of the synchronous machine of the invention is shown, wherein the reference numerals 7a, 7b, 7c designate field windings; 4a, 4b, 4c designate rotor yokes; 3a, 3b, 3c, 3d designate rotor magnetic cores. The rotor yokes 4a–4c and the rotor magnetic cores 3a–3d can be formed in one piece.

The characteristic of the invention is to form a plurality of closed loops of the field magnetic flux, whereby the output torque T can be increased without increasing the diameter of the space Da and the acceleration response time. That is, the diameter of the space can be decreased and the acceleration response time can be shortened while providing the same output.

When the stator winding 2 is wound by passing the windings through the plurality of stator magnetic cores 1a–1d, and the positions of the rotor teeth or the positions of the stator deviate alternatively relative to the rotating direction by the electrical angle $\pi$, the length of the coil end of the stator windings 2a–2d in the axial direction can be shortened. Accordingly, the effective length in the axial spacing direction can be increased relative to the total length in the same axial direction, whereby it imparts lower inertia and high output.

FIGS. 3(a)–3(d) are respectively schematic views of patterns of the magnetic punched core (sectional views taken along the axis of the motor shaft) used for the synchronous machine of the invention. In FIGS. 3(a) through (d), the reference 11 designates teeth of the stator magnetic core 1; 12 designates a slot thereof; 31 designates teeth (magnetic) of the rotor 3; 32 designates a slot (non-magnetic); 13 designates a second tooth pitch for the stator winding 2 and 14 designates a second slot pitch for the stator winding 2.

Figure 3:
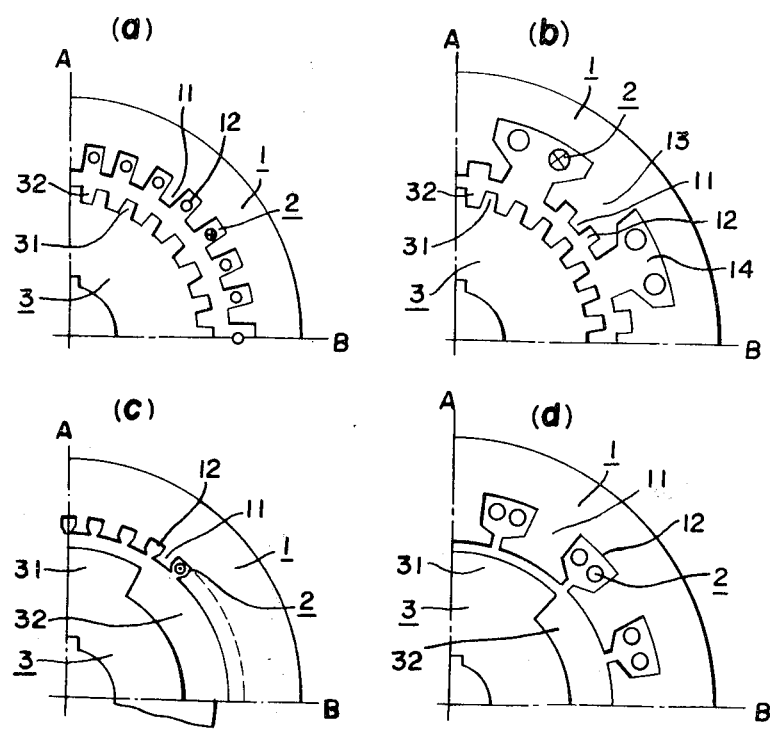
FIGS. 3(a)–3(d) are, respectively, schematic views of patterns of the magnetic cores used in the synchronous machine of the invention.

FIG. 3(a) shows the pattern for a high frequency synchronous machine or a step motor having a large number of steps. In FIG. 3(a), the stator winding 2 can be wound in stator slots by the method of winding used in polyphase distributed windings as in a conventional rotary electric machine; the method of winding on each tooth, the method of winding each group of teeth (plurality of teeth pitches), or other conventional winding techniques. The number of the rotor teeth may be different from the number of stator teeth with the difference of an even number, or the corresponding positions of the teeth may be shifted by grouping the teeth.

FIG. 3b shows the pattern for a high frequency synchronous machine or a step motor having large steps, wherein the second teeth pitch 11 are grouped and the second pitch slots 14 (which will be wound) are appropriately disposed. The stator winding in the system can be a concentrated winding or a distributed winding for a single phase, two-phases, three-phases or polyphase operation.

FIG. 3(c) shows the pattern for a non-commutator motor or a step motor having small steps, wherein the number of poles is small. In FIG. 3(c), the stator winding can be a polyphase distribution winding as in a conventional rotary machine.

FIG. 3(d) shows a pattern having a small number of the poles as in FIG. 3(c). The stator winding 2 is a concentrated winding, and can be wound so as to interlink the plurality of stator teeth 11. That is, the coil pitch of the winding can be an integer times the stator slot pitch.

Figure 4:
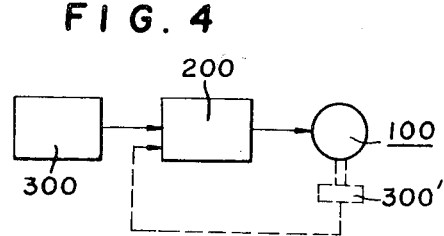
FIG. 4 is a diagram of the synchronous machine applied as a control motor according to the invention.

FIG. 4 is a schematic view of a motor using the synchronous machine of the invention. In FIG. 4, the reference 100 designates a homopolar synchronous machine having low inertia according to the invention; 200 designates a power supply for feeding power to the winding 2 of the synchronous machine; 300 designates a step-command or control device which commands the power supply to step the synchronous machine. The step-command or control device 300 can constitute the circuitry disclosed in U.S. Pat. No. 3,430,121. The power supply can be a square waveform current inverter, a square waveform voltage inverter or cycloconverter. The power supply may be the transistor inverter disclosed in U.S. Pat. No. 3,427,527 or the thyristor inverter disclosed in U.S. Pat. No. 3,469,169. When a sine waveform is utilized or a fine control or a smooth stepless control is utilized, it is possible to utilize the inverter disclosed in U.S. Pat. No. 3,423,663 or the inverter disclosed in U.S. Pat. No. 3,391,323. In a small size step motor, or non-commutator motor, it is possible to use a half waveform type or intermediate tap type inverter. In this case, the feeding device is referred to as a "chopper" or "amplifier".

When a non-commutator motor is used in FIG. 4, a detector 300' is provided to command the power supply 200 to impart self-stepping. Accordingly, in this case, the position detecting means 300' is used as a step command device 300. The position detecting means 300' may be the circuitry disclosed in U.S. Pat. No. 3,476,996.

Figure 5:
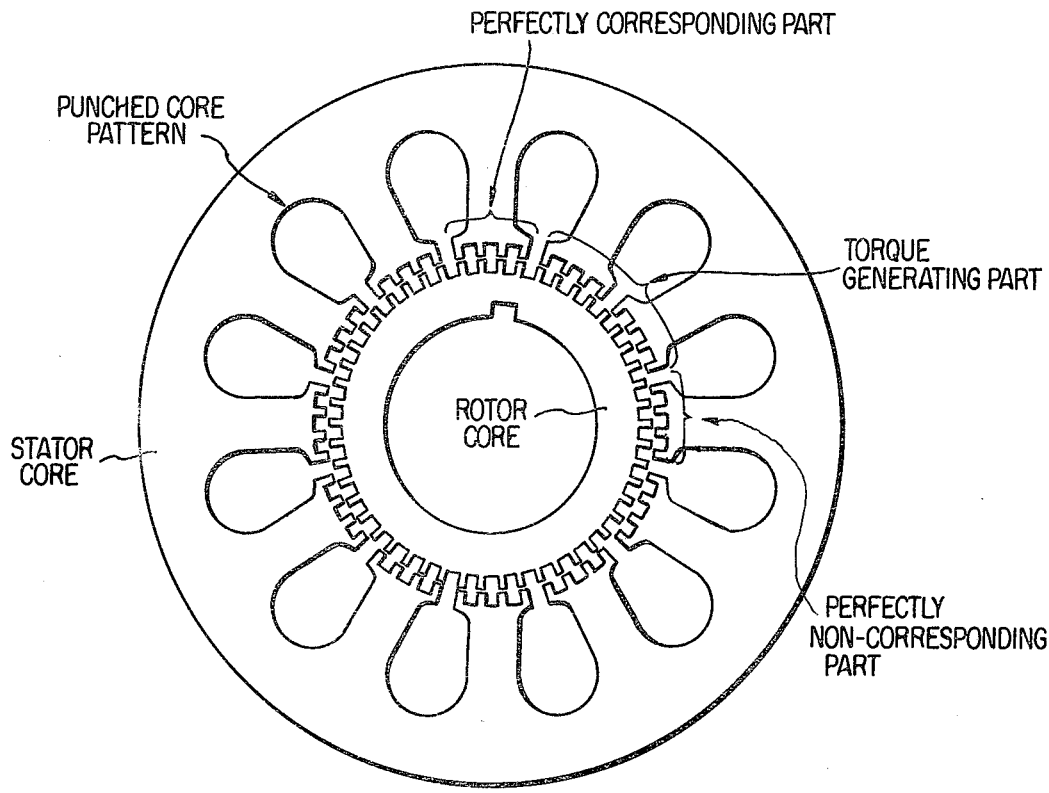
FIG. 5 is a sectional view showing the positioning of the rotor magnetic teeth with respect to the stator magnetic teeth.

FIG. 5 shows the positioning of the rotor magnetic teeth with respect to the stator magnetic teeth.

A feature of the invention is to have the stator magnetic teeth different in number from the rotor magnetic teeth as shown in FIG. 5. Accordingly, the number of stator magnetic teeth disposed precisely opposite to the rotor magnetic teeth is quite small as shown in FIG. 5. The parts which are disposed precisely opposite are two when there are four stator poles and are three when there are six stator poles. (the parts which are disposed precisely opposite are one half of the stator pole number).

With this feature, the torque applied to the rotor is actuated only at the parts where the stator magnetic teeth are not disposed precisely opposite to the rotor magnetic teeth. Accordingly the torque applied to the rotor is shifted in the circumferential direction depending upon the rotation of the rotor.

It is also possible to have the same number of stator magnetic teeth and rotor magnetic teeth where some of the stator magnetic teeth are disposed precisely opposite to the rotor magnetic teeth but most of the stator magnetic teeth are not disposed precisely opposite the rotor magnetic teeth. This can be achieved by having non-uniformly distributed teeth of the stator or rotor.

Figure 6:
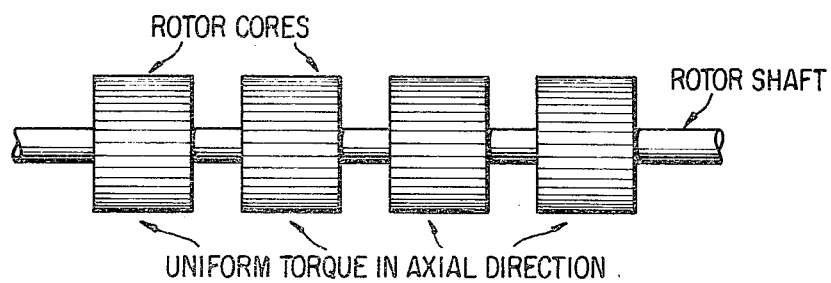
FIG. 6 is a view showing the rotor cores disposed along the rotor shaft.

In accordance with the invention, a plurality of stator cores and a plurality of rotor cores may be provided. The magnetic cores may be formed as shown in FIG. 6. With the rotors separated in the axial direction, the torque generating part is shifted in the cicumferential direction to rotate the rotors in unison. Therefore, even though a plurality of rotor magnetic cores are disposed in the axial direction, the forces applied to the rotor shaft are uniform at any position in the axial direction. Therefore, no bending stress is applied even though the shaft may be long.

In accordance with the invention, it is possible to provide a homopolar synchronous machine having low inertia which is suitable for use as a step motor, a non-commutator motor, a high frequency generator, etc. Furthermore, with the apparatus of the invention, the output capacity limitation for a given acceleration response time can be increased. The effect can be further improved by passing the stator winding through each stator magnetic core.

The synchronous machine of the invention is suitable for a control motor and performs with great improvement over prior art devices. As a step motor, for example, the best conventional synchronous machines (1.5 KW) have an acceleration constant of about 400 m/sec., to give 16,000 steps/sec. (3,200 rpm), and weigh about 60 Kg. However, the synchronous machine of the invention (1.5 KW) has an acceleration constant of about 60 m/sec. to give 16,000 steps/sec. (3,200 rpm) and weighs about 30 Kg.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A homopolar synchronous machine comprising:
   a stator including a plurality of stator cores separated along an axis, each stator core having an inner cylindrical surface, a plurality of slots and a plurality of ridges of stator magnetic teeth disposed around the inner cylindrical surface and extending parallel to the axis, the number of said stator magnetic teeth being greater than the number of said slots, each said stator core being formed of a plurality of laminated cores,
   a plurality of coils of stator windings contained in said slots, each slot containing a respective coil of said coils of said stator windings;
   a rotor including a plurality of rotor cores separated along the axis, each rotor core having an outer cylindrical surface and a plurality of ridges of rotor magnetic teeth disposed around the outer cylindrical surface and extending parallel to the axis, the number of said rotor magnetic teeth in each rotor core being more than the number of said slots in each stator core, each said rotor core being formed of a plurality of laminated cores,
   a plurality of rotor magnetic yokes, each rotor magnetic yoke being disposed between a pair of adjacent rotor cores, said rotor magnetic yokes and said rotor cores being disposed around a rotatable shaft,
   a field winding including a plurality of field coils, each said field coil being disposed between adjacent stator cores and wound around the ouside of said coils of stator windings and formed in a circular ring,
   a barrel-shaped stator magnetic yoke surrounding both said stator cores and said field coils, each said field coil being wound through a space surrounded by said stator magnetic yoke, said stator cores and said coils of stator windings,
   a plurality of closed magnetic circuits being formed including said stator cores, said rotor cores, said rotor magnetic yokes and said stator magnetic yoke, radial flux paths crossing the cylindrical air gap between the rotor cores and stator cores, and said field winding generating a field magnetomotive force for feeding magnetic flux to said closed magnetic circuits to impart a homopolar magnetic field in said radial flux paths,
   said stator magnetic teeth of each stator core being disposed precisely opposite some of said rotor magnetic teeth of each rotor core at only an even number of parts around said outer surface of each rotor core and facing said inner surface of each stator core, said oppositely disposed parts being separated by an equal angular distance,
   the angular pitch of said slots being the same for all stator cores and equal to a first pitch,
   the angular pitch of said stator magnetic teeth being the same for all stator cores and equal to a second pitch, and
   the angular pitch of said rotor magnetic teeth being the same for all rotor cores and equal to a third pitch.

2. A homopolar synchronous machine according to claim 1 wherein
   said second pitch is different from said third pitch, and said first pitch is equal to an integer times said second pitch.

3. A homopolar synchronous machine according to claim 1 wherein
   said second pitch is equal to said third pitch, and said first pitch is different from an integer times said second pitch.

4. A homopolar synchronous machine comprising:
   a stator including a plurality of stator cores having cylindrical inner surfaces and separated by disk-like spaces along a rotation axis, each of said stator cores having a plurality of slots and a plurality of ridges of stator magnetic teeth extending parallel to the axis, both said plurality of slots and said plurality of ridges of stator magnetic teeth being disposed alternately around the cylindrical inner surface of each stator core, the number of said slots being equal to the number of said stator magnetic teeth;
   a plurality of stator windings, each said stator winding having a plurality of stator coils, each stator coil having a pair of sides, each of said sides of the stator windings contained in each of said slots, so that all of said sides of the stator windings are distributed around said cylindrical inner surface with said ridges of stator magnetic teeth and said slots;
   a rotor including a plurality of rotor cores having cylindrical outer surfaces and separated by the disk-like spaces along the rotation axis, each of said rotor cores having a plurality of ridges of rotor magnetic teeth extending parallel to the axis, said ridges of rotor magnetic teeth being disposed around the cylindrical outer surface of each rotor core, the number of said rotor magnetic teeth being different from the number of said stator magnetic teeth by an even integer, and the angular pitches of said slots, of said stator magnetic teeth and of said rotor magnetic teeth being uniform, whereby said stator magnetic teeth of each stator core are disposed precisely opposite some of said rotor magnetic teeth of each rotor core at only an even number of parts around the said inner surface of each stator core and facing said outer surface of each rotor core, said oppositely disposed parts being separated by an equal angular distance;

a field winding having at least one field coil, each field coil disposed between adjacent stator cores and wound around said sides of the stator windings and forming a circular ring, a barrel-shaped stator magnetic yoke surrounding both said stator cores and said field coil; each said field coil being wound through a circular space surrounded by said stator magnetic yoke, said stator cores and said sides of the stator windings;

at least one rotor magnetic yoke disposed between a pair of adjacent rotor cores, said rotor magnetic yoke and said rotor cores being disposed around a rotatable shaft coincident with said rotation axis;

at least one closed magnetic circuit being formed including said stator cores, said rotor cores, said stator magnetic yoke and said rotor magnetic yoke, said closed magnetic circuit forming radial flux-paths crossing the cylindrical air gap between said cylindrical inner surface of each stator core and said cylindrical outer surface of each rotor core, and said field winding generating a field magnetomotive force for feeding magnetic flux to said closed magnetic circuit to impart a homopolar magnetic field in said radial flux-paths.

5. A homopolar synchronous machine according to claim 1 including a high frequency feeder for the stator windings and means for supplying commands to the feeder to control the feed in a stepwise manner.

6. A homopolar synchronous machine according to claim 4 including a high frequency feeder for the stator windings and means for supplying commands to the feeder to control the feed in a stepwise manner.

* * * * *

UNITED STATES PATENT AND TRADEMARK OFFICE
CERTIFICATE OF CORRECTION

PATENT NO. : 4,134,054
DATED : January 9, 1979
INVENTOR(S) : MASAHIKO AKAMATSU

It is certified that error appears in the above-identified patent and that said Letters Patent are hereby corrected as shown below:

Column 5, line 68:
    Please change "ouside" to --outside--.

Signed and Sealed this

Third Day of July 1979

[SEAL]

Attest:

LUTRELLE F. PARKER

Attesting Officer     Acting Commissioner of Patents and Trademarks